United States Patent [19]

DeCarlo

[11] 4,092,859

[45] June 6, 1978

[54] OSCILLATING WING FLOWMETER

[75] Inventor: Joseph P. DeCarlo, Wrentham, Mass.

[73] Assignee: The Foxboro Company, Foxboro, Mass.

[21] Appl. No.: 801,955

[22] Filed: May 31, 1977

[51] Int. Cl.² .................................................. G01F 1/00
[52] U.S. Cl. .................................................. 73/194 B
[58] Field of Search .............................. 73/194 B, 228

[56] References Cited

U.S. PATENT DOCUMENTS 2,519,015  8/1950  Bensen ..................................... 73/194
3,175,399  3/1965  Medlar ..................................... 73/194

Primary Examiner—Herbert Goldstein
Attorney, Agent, or Firm—Andrew T. Karnakis; William W. Rymer

[57] ABSTRACT

At least one of two wing-like elements that extend longitudinally alongside each other in the stream of a flowing fluid is pivotally mounted so as to oscillate at a frequency proportional to fluid flow rate. These elements, after being properly positioned with respect to each other, are readily inserted in large conduits to provide accurate measurement of line average flow rate over a wide range of values.

10 Claims, 9 Drawing Figures

OSCILLATING WING FLOWMETER

FIELD OF THE INVENTION

This invention relates to measurement of flow rate, particularly flow rate of gases in large conduits, even at low flow rates.

BACKGROUND OF THE INVENTION

Accurate measurement of average flow rate in large line size gas ducts has heretofore been difficult, and often expensive. The available instruments in use today fall into two basic categories: (1) instruments installed directly in the line that measure an average flow rate, such as the orifice, the venturi and flow nozzles; and (2) instruments inserted into an existing line that measure point flow rates and rely on mathematical averaging techniques to obtain the average flow rate, such as hot-film probes, pitot probes, insertion turbine meters, and insertion vortex meters. The instruments installed directly in the line are expensive and cumbersome to install. Insertion type probes are less expensive and easier to install, but have poor accuracy of average flow rate, owing to the use of point measurements to obtain it.

SUMMARY OF THE INVENTION

I have discovered that very accurate line average flow rate metering may be achieved, inexpensively and simply, even in large gas conduits, by mounting a pair of wing-like elements in a generally side-by-side relation. If properly positioned in detail with respect to each other, and if at least one of the elements is pivotally mounted at its ends, oscillation will occur at a frequency proportional to average flow rate. In preferred embodiments, each wing is an airfoil-type structure in cross-section; one is fixed and the other is near the first and is pivotable about an axis generally parallel to the first wing.

PREFERRED EMBODIMENT

I turn now to a description of the presently preferred embodiment of the invention.

DRAWINGS

DESCRIPTION

Figure 1:
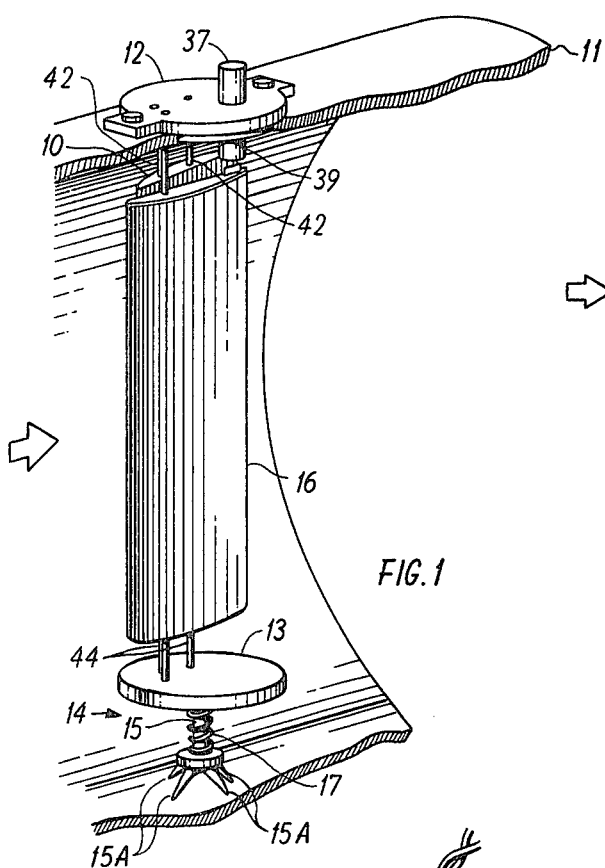
FIG. 1 is a perspective view, broken away, of the wing-like elements mounted in a large conduit.

The embodiment shown in the drawings is constructed and operates as follows.

With reference to FIG. 1 the flowmeter assembly includes a fixed wing 10 formed of carbon steel strong enough to act as a support member for the entire structure, top and bottom aluminum plates 12 and 13, and an oscillating wing 16 pivotally mounted between both plates alongside the fixed wing. All of these elements are assembled into a unit prior to insertion into a conduit 11.

A support member 14, which includes an inner shaft (not shown) attached to the bottom plate 13, a concentric slidable outer shaft 15 terminating in four sharply tapered legs 15a and a spring 17 connected between the bottom plate and the outer shaft fixedly holds the meter structure against the bottom portion of the conduit 11.

Figure 2:
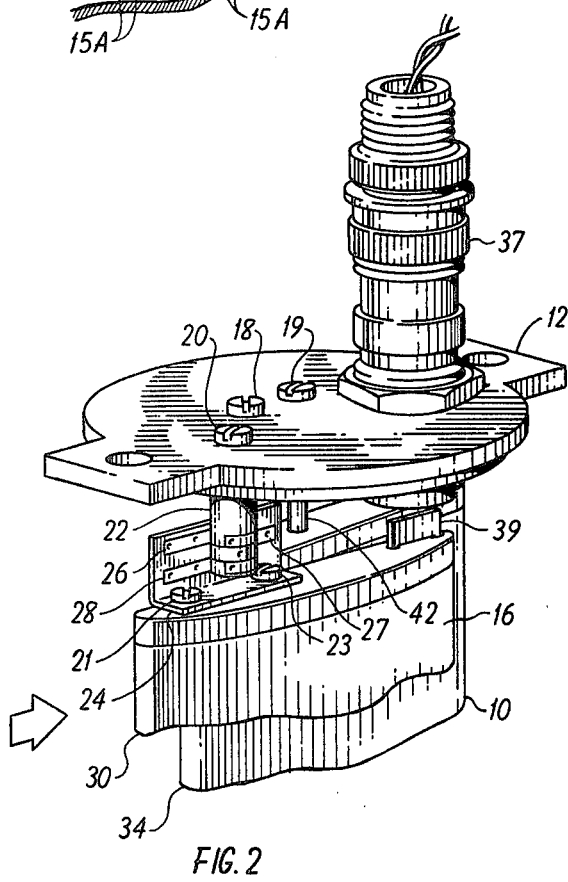
FIG. 2 is a partial perspective view of one end of the meter assembly.
Figure 3:
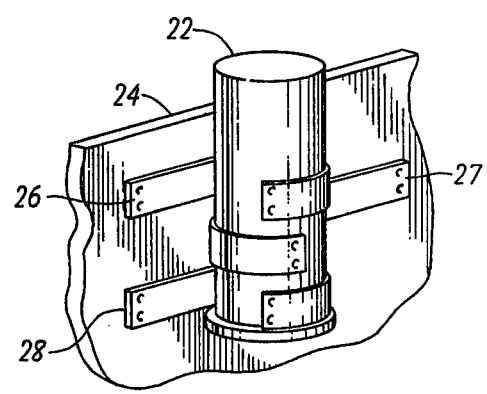
FIG. 3 is a partial enlarged perspective view of the pivotal end mounting for the oscillating wing.

Turning now also to FIGS. 2 and 3, the fixed wing 10 is supported by a pair of top and bottom posts 42, 44 secured by bolts 18 and 19. The wing 16 is supported for oscillatory movement by a flexural pivot which includes a cylindrical shaft 22 secured to the top plate 12 by a bolt 20. A bracket 24, mounted on the oscillating wing by bolts 21 and 23, is also secured to the shaft by three flexible steel straps 26, 27, 28 that are tack welded towards the straps extremities to both the shaft and the bracket. Arranging the straps so that they alternatively wind and unwind around the shaft permits the bracket to freely roll about the shaft. The overall assembly thus provides a low friction pivot accomodating large angular displacement of the oscillating wing, while also prohibiting longitudinal and lateral movement thereof. A support structure co-operating with the bottom plate 13 identical to that outlined above is provided at the other end of both wings.

Figure 4:
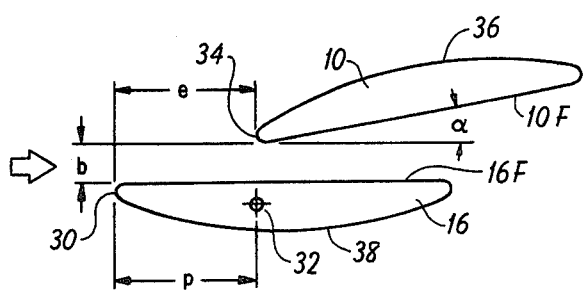
FIG. 4 is a diagrammatic sectional view of the two wing-like elements of preferred embodiments, taken transversely thereof.

The positional relationship between the fixed wing 10 and the oscillating wing 16 in one position of the latter is best shown in FIG. 4. While the various parameters are expressed in FIG. 4 in letters, in this most preferred embodiment $\alpha = -4° \ 30' \ b = 0.45$ inches, $e = 0.80$ inches and $p = 0.88$ inches.

The oscillating wing 16 has a "syntactic foam" core formed from glass macroballoons and epoxy resin (Allied chemical 2795) and is covered with three layers of 0.20 inch woven fiber glass, and weighs 2.34 pounds. Both wings are 56 inches long, 3 inches wide (the "Chord"), and 0.44 inches at their thickest. Additionally, each wing has a flat surface (10F and 16F) which face one another. Opposed surfaces 36 and 38 are of greater transverse perimeter than these flat surfaces, with each being defined over their main portions by a 4-inch radius.

Four important dimensions, shown in FIG. 4, are: the fixed wing angle af attack ($\alpha$); (a negative angle of attack is shown in FIG. 4); distance in a flow direction from the leading edge 30 of the oscillating wing to the axis of oscillation 32 (p); distance between wings at their closets positions when the angle of attack of the oscillating wing is 0° (i.e., as in FIG. 4) (b); and distance in a flow direction between the leading edge 30 and the leading edge 34 of the fixed wing (e).

Oscillation is sensed with a standard Foxboro magnetic flow type turbine meter sensor 37 mounted so that a small metal tab 39 atop the wing cuts the magnetic field of the sensor each time the oscillating wing passes by.

In operation, the meter assembly, with all the dimensions discussed above properly set, may easily be inserted as a unit in a conduit by simply drilling a suitable hole in the conduit, placing the meter assembly therein with the support member 14 resting on the opposite wall of the conduit, and fastening the top plate 12 to the duct 11. As the top plate is tightened, the compressive force exerted by the spring 17 securely engages the legs 15a to the bottom of the conduit.

Flow then produces the oscillations, which may be processed conventionally from the sensor output. Since the wing elements extend across substantially all of the conduit, regular oscillations are easily produced over wide ranges of flow, thereby providing an accurate readout of real line average flow rates, even in large gas conduits at low velocities.

OTHER EMBODIMENTS

Other embodiments within the invention and claims will be apparent to those skilled in the art.

For example, the oscillating wing weight and parameters $\alpha$, $b$, $p$, and $e$ may be varied. Preferred angles $\alpha$ are in the range 0° to −20°. It is essential that $p$ be less than half the wing element width. The parameter $b$ may be up to 0.6 inches. The parameter $e$ may be ± 70% of chord; $e$ can thus be negative (i.e.; the leading edge of the fixed wing positioned upstream from that of the oscillating wing).

Again both wings may be mounted for oscillation about longitudinal axes transversely nearer their respective leading edges than their respective trailing edges and with the longer transverse perimeter of each wing being on their outer surfaces and the shorter transverse perimeter of each being adjacent.

Also, oscillating wings can be made of fiberglass around a solid polyurethane core, aluminum, or a fiberglass-covered glass-balloon-filled resin. The most preferred form of oscillating wing may ultimately prove to be the latter, coated with fused graphite rather than fiberglass.

Design

The design of other embodiments is facilitated by my design discoveries. I have discovered not only that two elements of the sort I have discussed will produce oscillations reflective of flow rate, but a number of other important circumstances as well. I have found that oscillation varies not only with wing weight but as well with $\alpha$, $b$, $e$, and doubtless $p$ (although I have as yet made no detailed study of that variable). These variables may be usefully considered first in terms of design of the presently preferred embodiment.

Figure 5:
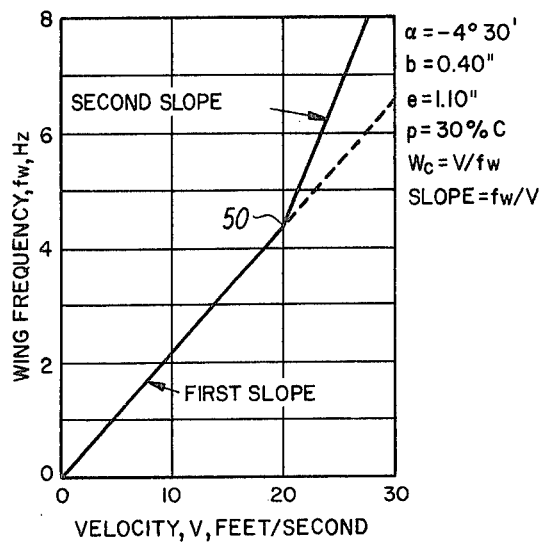
FIG. 5 is a graph of velocity against oscillation rate used in the design of the preferred embodiment.

I have found that it is desirable, over a very wide range of wing weights and sizes, to first set $p$ at 30% of chord, $\alpha$ at −5°, b at 0.30 inches, and $e$ at the value calculated for $p$. Secondly, $\alpha$ was varied ± 3° about its initial setting to establish the angle that produced the largest visible oscillation amplitude. In the preferred embodiment, that value of $\alpha$ was determined to be −4° 30′. From the graph of flow rate against oscillations, the inverse of the slope, which is $W_c$ (units (ft/sec)/(pulses/sec), or ft/pulse) was then determined experimentally. In designing the most preferred embodiment, although slopes were linear, there were two slopes, a first slope from the origin, the inverse of which is $W_{c1}$, and a second slope breaking upwardly therefrom in a decreased inverse slope (i.e., $W_{c2}$) at 50, as shown in FIGS. 5 and 6.

It is desirable that $W_{c2} = W_{c1}$, so that there be one linear slope intersecting the origin. To achieve this in the design being discussed, the inverse slope $W_{c2}$ must be increased.

Figure 6:
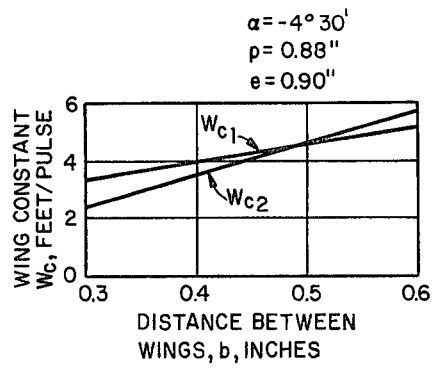
FIGS. 6 and 7 are graphs of the ratio of velocity divided by oscillation rate, for two portions of the plot, against respectively, two design variables.

Increasing $b$, I have found increases $W_{c2}$ (and, to a lesser extent, and least often, $W_{c1}$) as shown in FIG. 6. Accordingly, a second, larger value of $b$ was tried at 0.5 inches. However this distance was so great that there was no oscillation in this embodiment, so that b was reduced to 0.45 inches. A graph (not shown) like that of FIG. 5 was then plotted for this set of parameters, and the second slope still broke up from the first slope.

Figure 7:
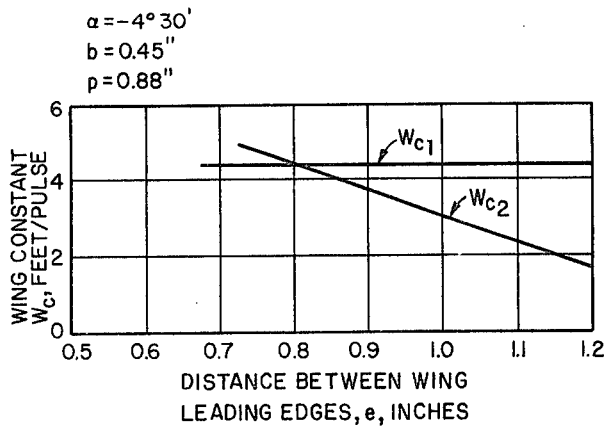
Figure 8:
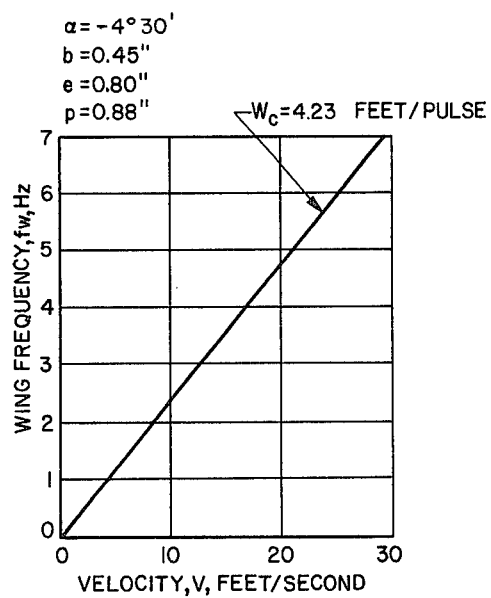
FIG. 8 is a graph of velocity against oscillation rate for the presently most preferred embodiment.

I have also found that decreasing e increases the inverse slope $W_{c2}$; $W_{c1}$ is less sensitive to this change (see FIG. 7). Accordingly, I decreased e, holding the other parameters at the figures last mentioned, and plotted e against $W_{c1}$ and $W_{c2}$ as shown in FIG. 7. The lines crossed at 0.80 inches, meaning that the slopes were the same at that dimension; thus, the final design was arrived at. Its magnificent straight linearity through the origin is shown in FIG. 8.

Figure 9:
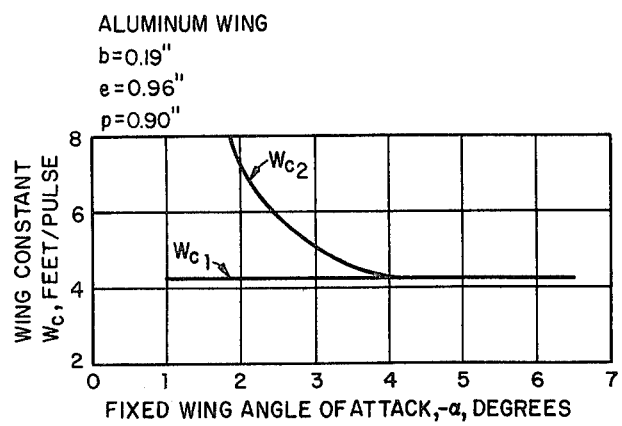
FIG. 9 is a graph of the ratio shown in FIGS. 6 and 7 against another design variable, for another embodiment.

In the design of other embodiments, the relation between the specified parameters may of course be varied in other ways and other orders in empirical step-wise design. Specifically, $\alpha$ may in some instances be usefully used to vary design, as found when using a solid aluminum oscillating wing (FIG. 9).

In general, increasing wing weight increases the final value of $W_c$.

I claim:
1. A fluid flow meter comprising:
   a first wing element;
   a second wing element;
   said wing elements extending longitudinally alongside each other;
   said second wing element having an inner surface toward said first wing element, an opposite outer surface, a leading edge, and a trailing edge;
   said second wing element being mounted for pivotal movement about an axis longitudinally thereof;
   said axis being transversely nearer said leading edge than said trailing edge;
   whereby said second wing oscillates at a frequency proportional to flow rate.
2. The meter of claim 1 in which said first wing element is mounted for pivotal movement about an axis longitudinally thereof.
3. The meter of claim 1 in which said outer surface of said second wing element is of greater transverse perimeter than said inner surface thereof.
4. The meter of claim 3 in which said outer surface of said first wing element is of greater transverse perimeter than said inner surface thereof.
5. The meter of claim 4 in which the attack angle of said first wing element with respect to fluid flow is in the range of 0° to −20°, the distance between said wing elements at their closest positions when the attack angle of said second element is 0° is no greater than 0.6 inches, and the distance in a flow direction between leading edges of said wing elements is ±70% of chord.
6. The meter of claim 1 including a conduit for carrying a flowing fluid across which both said wing elements, extend.
7. The meter of claim 6 in which both said wing elements extend across substantially the entire distance between opposing walls of said conduits.
8. The meter of claim 6 in which said first wing element is formed of a relatively heavy, rigid material;
   both of said wing elements are assembled as a unit prior to insertion in said conduit;
   said first wing element providing sufficient support for said assembled unit;

whereby said wing elements may be readily inserted in said conduit without having to make design changes thereto.

9. The meter of claim 1 in which said second wing element is suspended at opposite ends for pivotal movement by flexural pivot means on respective ends thereof.

10. The meter of claim 9 in which said flexural pivot means comprises a cylindrical shaft having one end extending toward respective ends of said second wing element and having its other end fixedly secured to said assembled unit;
 a member mounted on said respective ends of said second wing element in the vicinity of said shaft;
 a plurality of flexible straps rollable on said shaft secured thereto and to said member, thereby mounting said second wing element for free pivotal movement while preventing longitudinal and lateral movement thereof.

* * * * *